C. E. LOETZER.
AUTOMATIC CARBURATION VALVE.
APPLICATION FILED NOV. 14, 1916.
1,242,706.
Patented Oct. 9, 1917.
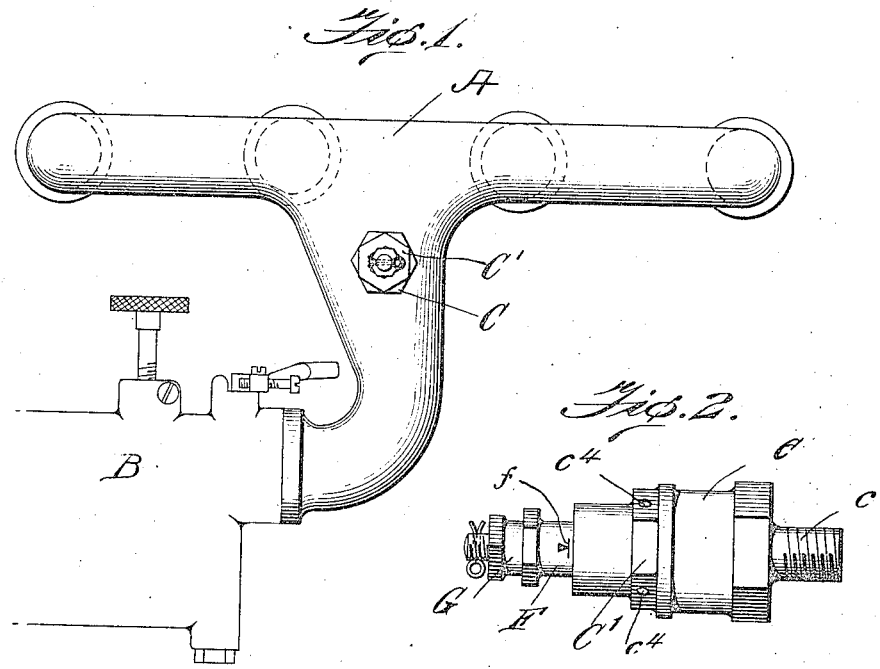
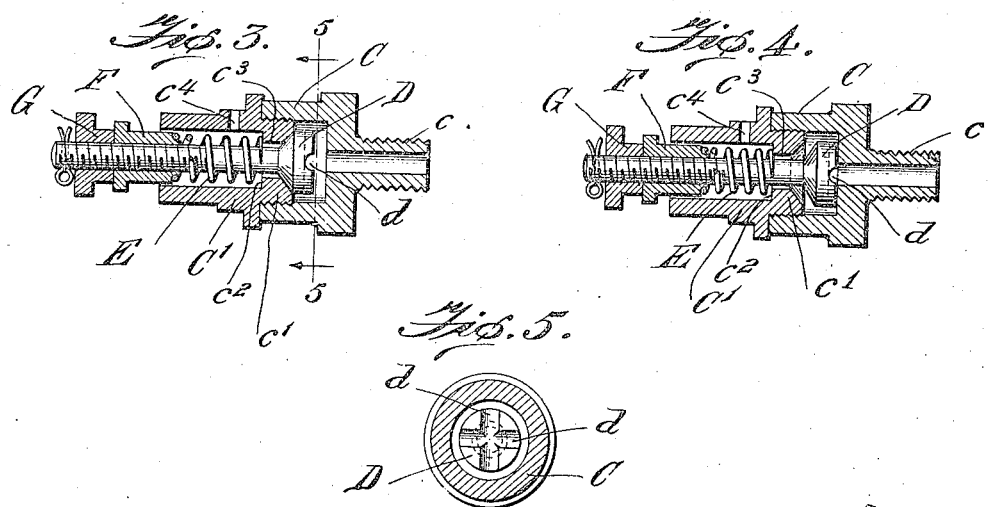
Witnesses
Inventor
Christian E. Loetzer
By his Attorney

UNITED STATES PATENT OFFICE.

CHRISTIAN E. LOETZER, OF SAYRE, PENNSYLVANIA.

AUTOMATIC CARBURATION-VALVE.

1,242,706.  Specification of Letters Patent.  Patented Oct. 9, 1917.

Application filed November 14, 1916. Serial No. 131,305.

*To all whom it may concern:*

Be it known that I, CHRISTIAN E. LOETZER, a citizen of the United States, residing at Sayre, in the county of Bradford and State of Pennsylvania, have invented certain new and useful Improvements in Automatic Carburation-Valves; and I do hereby declare the following to be a full, clear, and exact description of the invention, such as will enable others skilled in the art to which it appertains to make and use the same.

This invention relates to air inlet valves for internal combustion engines, and more particularly to valves used for introducing air above the carbureter in an automobile engine, so as to supply air for admixture with the mixture of air and vaporized gasolene passing to the cylinders from the carbureter in addition to the air which is admitted through the carbureter.

In the operation of motor cars, when the engine is laboring hard, as when the car is climbing a hill or passing over sandy or muddy roads, the throttle is necessarily opened more and more widely to speed up the engine as the labor or power required to run the car is increased, while in passing over level and smooth roads the throttle is partially closed. As the throttle is opened wider, a relatively increasing volume of mixture is drawn into each cylinder, which produces a correspondingly greater compression therein. Furthermore, as is well recognized in gas engine practice, as the throttle is opened the mixture tends to become richer. And hence it has been found to be true that the resultant increase in speed of the engine is greater in proportion to the opening of the throttle; that the speed of the engine increases in greater proportion than the size of inlet afforded as the throttle is opened, so that as the latter is opened the vacuum or suction in the inlet manifold increases. For these reasons when the engine is at hard labor with the throttle wide open the suction from the cylinders through the intake pipe and carbureter is very much greater than it is when the car is running on a level and smooth road, and consequently a larger percentage of gasolene is drawn into the cylinders than is required to provide an explosive mixture of air and vaporized gasolene in the same proportions as when the engine is not at hard labor, with the result that there is not only a waste of fuel, but it seriously interferes with the operation of the engine, as the fuel mixture becomes too rich in gasolene, the air and gasolene not being fed in proper proportions, and the engine is liable to become choked and will not run smoothly or with the highest efficiency. To overcome this difficulty it has heretofore been proposed to provide means for admitting air to the cylinders or intake pipe in addition to the air which enters through the carbureter, and it has been proposed to utilize the increased cylinder suction to open the valve through which additional air is admitted above the carbureter; but such devices as heretofore constructed are unadapted to maintain the proper proportions of air and gasolene under varying conditions or requirements in practical use, being adapted to supply air in addition to the air that enters through the carbureter when the latter air supply is sufficient and to supply more air than is needed at other times, thus rendering the explosive mixture at times too poor in gasolene and the additional air supply is too fluctuating to enable the engine to attain the highest efficiency.

The object of my invention is to overcome these difficulties and secure more perfect carburation in gasolene engines, especially engines used in motor cars, and more particularly to provide a device of the character referred to which will automatically admit air as needed for admixture with the air and vaporized gasolene passing from the carbureter through the intake pipe or manifold of an automobile engine into the cylinders or explosion chambers, in such manner as to insure the admission of a sufficient quantity of air at the proper time and in proper proportion in addition to that which enters through the carbureter to produce an explosive mixture in such relative proportions as will produce the best results possible as well when the engine is at hard labor as when the work is light, as in climbing a hill or passing over a sandy or muddy road, or when the car is running on a smooth and level road, when little or no air is needed in addition to that which is admitted through the carbureter.

The invention will first be hereinafter more particularly described, with reference to the accompanying drawings, which form a part of this specification, and then pointed out in the claim at the end of the description.

In said drawings, Figure 1 is a side elevation of a portion of a carbureter and intake pipe of an automobile engine with my improved automatic carburation valve attached above the carbureter;

Fig. 2 is a side view of the valve detached;

Fig. 3 is a longitudinal sectional view showing the valve closed;

Fig. 4 is a longitudinal sectional view showing the valve wide open; and

Fig. 5 is a detail transverse section taken on the line 5—5 of Fig. 3.

Referring to said drawings, in which the same reference letters are used to denote corresponding parts in different views, the letter A may denote the intake pipe or manifold of an automobile engine through which the engine cylinders are connected with the carbureter B. These parts may be of the form shown or any well known construction, adapted to provide an explosive charge to be drawn by suction through the intake pipe or manifold into the engine cylinders. The letter C denotes one section of the valve casing which, in the form shown, is constructed with a reduced exteriorly threaded extension c which may be screwed into an interiorly threaded opening through the intake pipe A, or other structure in connection with which the device is adapted to be used; said extension being tubular to provide a passage therethrough in communication with the valve chamber formed in the other end of said section C, which is interiorly threaded to adapt it to be screwed upon an exteriorly threaded portion $c^1$ of another section $C^1$ of the valve casing, the latter section having a smooth bore with a shoulder $c^2$ at the inner end thereof and an outlet port $C^3$ through its threaded end for the passage of air into the valve chamber and to receive the stem of the valve D. The inner end of the section $C^1$ is countersunk or concaved to provide a seat for the valve D which opens toward the casing section C and is normally held to its seat by the pressure of a coiled or other suitable spring E, which is fitted within the bore of the section $C^1$ between said shoulder $c^2$ and an adjusting nut F screwed on the valve stem, whereby the tension of the spring may be varied as desired to adapt the spring to exert greater or less force to be overcome by suction in opening the valve. A lock nut G may also be screwed upon the valve stem so as to engage the adjusting nut F and lock the same in any desired position within the limits of movement permitted by the adjusting screw so as to regulate the pressure of the spring. Preferably three, more or less, holes $c^4$ are formed in the section $C^1$ of the casing, for the admission of air which may pass thence into the valve chamber and out through the tubular extension c of the other casing section into the intake pipe or manifold A, for admixture with the combined air and vaporized gasolene that is being drawn through the carbureter. The pressure of the spring may be varied by the adjusting devices F, G, to adapt the valve to partially open when the suction exceeds such pressure. Ordinarily, or when used on a machine such as the well known Ford automobile, for example, the spring should be so adjusted that it will require a pressure of about two pounds to open the valve sufficiently to permit air to enter to maintain the desired relative proportions of air and vapor as the cylinder suction is increased, and as the suction is further increased under increased labor of the engine, with the throttle more widely open, the admission of air in the proper proportion in addition to that which enters through the carbureter will be effected automatically by the increased cylinder suction, which opens more and more widely the air valve in opposition to the gradually increasing pressure of the spring, so as to maintain a mixture of air and vaporized gas in substantially the same correct relative proportions whether the engine is at hard labor, as in climbing a steep hill, or whether the work is light, as when the car is running on a nicely paved, smooth and level road. After the proper pressure or tension has been placed on the spring E, by means of the adjusting devices F and G, to adapt the valve to begin to open for the admission of air only when the suction is sufficient to overcome such pressure, and to enable the operator to quickly and correctly reëstablish the proper pressure or tension in case of any subsequent disturbance or disarrangement of the adjustment, a visual mark may be placed on the adjusting nut F, as at f, Fig. 2, which will indicate the relative positions of the parts when adjusted so as to enable the spring to exert the desired pressure to be overcome by the suction before any air is admitted. This mark may be so placed that it will be flush with the free end of the section $C^1$ of the valve casing when the valve is in closed position with the proper pressure or tension placed on the spring, but preferably the mark is placed higher up on the adjusting nut, as shown, or about $\frac{1}{32}''$ from said free end of said section $C^1$ so that it will be flush with said end when the valve is approximately at the extreme limit of its movement in opening under hard labor of the engine. To prevent the outlet port from being closed when the air valve is thrown wide open, as shown in Fig. 4, the front face of the valve D is formed or provided with transverse grooves d, preferably in the form of a cross, as shown in Fig. 5, to permit the air to escape through such grooves.

The utility and advantages of my improvement are obvious. In case of hard labor, with wide open throttle, the suction from the cylinders through the intake pipe and carbureter will open the valve to greater or less extent according to the work the engine is required to do, the air valve being adapted to open gradually as the suction is increased and to close gradually as the suction is decreased and to cut off entirely the admission of air in addition to that which enters through the carbureter, when the work or labor of the engine is reduced so that sufficient air will be supplied through the carbureter alone, and when more air is needed it will be supplied automatically in a definite regulated quantity, so as to maintain the desired relative proportions and produce a mixture which will enable the engine to attain the highest efficiency under varying conditions and requirements in practical use. Ordinarily an explosive mixture in the desired relative proportions consists of about one part of gasolene to six parts of air, and when my improvement is used, for example, in connection with a carbureter of the type used in a Ford machine, and the work is light, sufficient air will enter through the carbureter, rendering it unnecessary to introduce additional air to the explosive mixture in its passage through the intake pipe to the engine cylinders, but as the labor of the engine is increased and it becomes necessary to speed-up the engine the throttle is opened more and more widely to supply an increased amount of explosive mixture, the air entering through the carbureter will be insufficient to produce a mixture in the desired relative proportions, but when the cylinder-suction is sufficient to overcome a pressure of about two pounds, the air valve will be partially opened to admit additional air, and under increased labor, producing increased suction, greater force being required to compress the spring, the air valve will be opened more and more widely to permit additional air to enter the intake pipe in proper proportion to produce and maintain a mixture of air and vaporized gasolene in the desired relative proportions as the labor of the engine is increased, and vice versa. It should also be noted that the two members of the valve casing may be easily taken apart, for cleaning the valve or other purposes, and the member which carries the valve may be removed without removing or disturbing the connection between the other member and the intake pipe to which the device is attached.

Having thus described my invention, what I claim as new and desire to secure by Letters Patent of the United States is:

An automatic carburation valve comprising a valve casing composed of connected sections with an intervening valve chamber, one section being provided with a valve seat on its innermost end and provided with a valve stem housing at its outermost end, said housing communicating with the air, a valve normally seated on said seat and having its stem projecting through said valve housing and beyond the same, a spring in said housing and adapted to normally seat said valve, and adjusting means on said stem adapted to freely extend into said housing; the other section being adapted for attachment to the intake of an internal combustion engine and forming an abutment for the valve in its extreme open position, and means permitting the passage of air through the valve when the same strikes its abutment at extreme open position.

In testimony whereof I affix my signature in the presence of two witnesses.

CHRISTIAN E. LOETZER.

Witnesses:
  C. H. BAGLEY,
  CHAS. C. WEST.